United States Patent [19]

Beebe

[11] 4,244,015

[45] Jan. 6, 1981

[54] PULSE WIDTH MODULATED INVERTER

[75] Inventor: Ronald F. Beebe, Simi Valley, Calif.

[73] Assignee: Litton Systems, Inc., Beverly Hills, Calif.

[21] Appl. No.: 42,387

[22] Filed: May 24, 1979

[51] Int. Cl.³ .................... H02P 13/20; H02M 7/537
[52] U.S. Cl. .......................................... 363/8; 363/41; 363/97
[58] Field of Search .................. 363/8, 10, 41, 42, 97, 363/160, 163, 98, 134

[56] References Cited

U.S. PATENT DOCUMENTS

| | | | |
|---|---|---|---|
| 3,246,231 | 4/1966 | Clarke | 363/160 |
| 3,409,817 | 11/1968 | Gillett | 363/42 |
| 3,916,284 | 10/1975 | Hilgendorf | 363/10 |

FOREIGN PATENT DOCUMENTS

| | | | |
|---|---|---|---|
| 1376711 | 9/1964 | France | 363/8 |
| 1036464 | 7/1966 | United Kingdom | 363/41 |
| 1544623 | 4/1979 | United Kingdom | 363/41 |

*Primary Examiner*—William H. Beha, Jr.
*Attorney, Agent, or Firm*—Roy L. Brown; Harold E. Gillmann

[57] ABSTRACT

Apparatus for chopping DC power at a high frequency, for example 20 kHz, such high frequency being pulse-width modulated by a lower power frequency source at the desired power frequency. The pulse width modulation is servo controlled through current and voltage feedback to cause the current delivered to a load impedance to be in phase with a reference to power frequency oscillator and to control the output frequency voltage amplitude.

5 Claims, 1 Drawing Figure

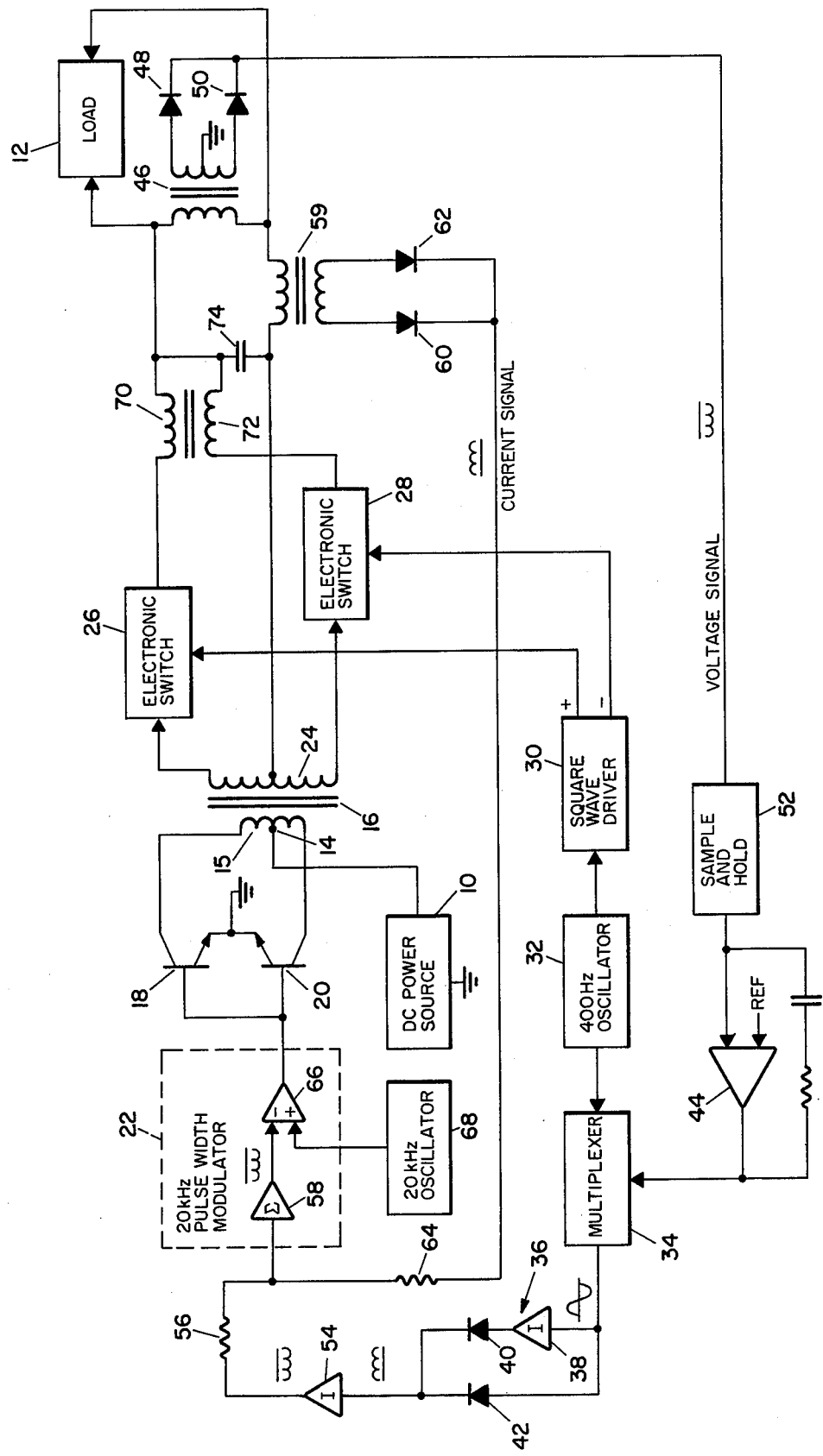

PULSE WIDTH MODULATED INVERTER

BACKGROUND OF THE INVENTION

There is a continuing interest in efficiently converting from DC to AC power under controlled conditions and from AC at one frequency to AC at another frequency.

The following U.S. patents are examples of the prior art:

The U.S. Pat. No. 3,564,390 apparatus accepts a lower power frequency then samples the lower power frequency at a high sample frequency. By using a high frequency transformer, which is lighter, the weight of the power supply can be lessened. The lower frequency is then reconstructed at the output of the high frequency transformer but at a higher voltage.

U.S. Pat. No. 3,882,369 pertains to a circuit for controlling the cycle of silicon controlled rectifiers.

U.S. Pat. No. 3,321,693 pertains to producing three phase power by chopping DC power using a three phase oscillator as a control signal.

The U.S. Pat. No. 3,249,845 apparatus converts the frequency of error signals so that an error signal at one frequency may be used to control a servo transducer which is only responsive to another frequency.

U.S. Pat. No. 2,776,379 shows a circuit for creating output power at a constant frequency even though the input power frequency varies.

U.S. Pat. No. 3,517,297 pertains to a circuit for intermixing a low and high frequency signal to produce a signal having the frequency of the difference of the frequencies of the high and low frequency signals.

U.S. Pat. No. 3,742,336 pertains to a circuit which converts AC or DC to polyphase AC, single phase AC, or DC output voltage particularly adapted to drive a variable speed AC motor.

BRIEF DESCRIPTION OF THE INVENTION

The apparatus of this invention is adapted to produce alternating power at a predetermined frequency with a predetermined voltage amplitude and wave shape but controllable phase to keep the alternating output current in phase with a power frequency oscillator.

The source of energy, in the form of a DC power source is connected to be modulated by a high frequency pulse width modulation at an average frequency of, for example, 20 kHz. A power frequency oscillator, for example, at 400 Hz, produces a signal which pulse width modulates the high frequency signal. The amplitude of the modulating signal, in turn is controlled through a multiplier to be responsive to the deviation of the amplitude of the 400 Hz output voltage from a predetermined amplitude. The pulse width modulator is further controlled to be responsive to the phase difference between the 400 Hz oscillator and the output current of the supply. The output of the pulse width modulator is delivered through a power transformer to a pair of electronic switches connected to the output of the transformer and responsive to the polarity of the voltage from the 400 Hz oscillator. The output signal is then filtered to remove the 20 kHz power and is delivered to a load impedance.

A voltage transformer, together with rectification means is connected across the load. The voltage is compared to a reference voltage, and the voltage error signal is then used to control the amplitude of the 400 Hz signal which is delivered to the input of the pulse width modulator.

A current transformer in series with the load delivers a rectified signal back to the input of the pulse width modulator to phase-lock the output current with the 400 Hz oscillator by pulse width modulating the signal in a fashion to vary the phase of the output 400 Hz voltage.

It is therefore an object of this invention to produce a low frequency power signal.

It is another object of this invention to produce such a signal wherein DC is converted to the low frequency power.

It is a more specific object of this invention to produce such a power signal wherein the amplitude of the output voltage is servoed.

It is still a more specific object of this invention to produce such a power signal wherein the output current is servoed to phase-lock with a reference voltage.

A BRIEF DESCRIPTION OF THE DRAWINGS

Other objects will become apparent from the following description, taken in conjunction with the accompanying drawing which is a block diagram and partial schematic of a typical apparatus in accordance with this invention.

DETAILED DESCRIPTION OF THE INVENTION

The apparatus of this invention converts power from DC at the DC power source 10 into low frequency power, for example 400 Hz at the load 12. The load 12 may be resistive or reactive, linear or non-linear.

The output of the DC power source 10 is connected to the center tap 14 of the primary winding 15 a power transformer 16. The DC power is commuted by a pair of oppositely poled power transistors 18, 20 whose collectors are shown connected to opposite ends of winding 15 and whose emitters are grounded. It is apparent that the transistors could be oppositely poled, be of opposite types, be silicon controlled rectifiers, be vacuum tubes, or other valve circuits known to persons skilled in the art.

The conduction of the power transistors 18, 20 is controlled by the output signal of the high frequency pulse width modulator 22.

The secondary winding 24 of the power transformer 16 is connected at its ends to a pair of electronic switches 26, 28 which may be diode or transistor circuits or their equivalent with silicon controlled rectifiers or vacuum tubes. The electronic switches 26, 28 are connected through a square wave driver 30 to a source of power frequency signal 32, for example, at 400 Hz.

The square wave driver is adapted to produce square waves which are poled above and below zero to control the electronic switches 26, 28 so that one switch conducts during one-half cycle of the output of oscillator 32.

The output of oscillator 32 is also connected through multiplier 34 to a full wave rectifying circuit 36 made up of an inverting amplifier 38 in one branch and a pair of diodes 40, 42 in the two branches, respectively, to produce a rectified signal which is offset from zero by a predetermined amount. The multiplying factor of the multiplier 34 is controlled in response to the output of the smoothing amplifier 44.

A potential transformer 46 is connected across the load 12, and the secondary voltage of transformer 46 is rectified by diodes 48, 50. The diodes 48, 50 are connected to the sample and hold circuit 52. The sample and hold circuit 52 is of a type to sample only the peaks of the voltage signal and to hold those values until the next peak. The output of the sample and hold circuit 52 is connected through smoothing amplifier 44 to control the multiplying factor of multiplier 34. But note that the output of amplifier 44 is never less than a predetermined minimum value so that there will be a signal delivered to the modulator 22 to control the wave shape of the voltage to the load 12.

The output of the rectifier 36 is connected through an inverting amplifier 54 and a summing resistor 56 to the input of the summing amplifier 58 of the pulse width modulator 22.

A current transformer 59 is connected in series with the load 12. Its secondary winding is connected through two diodes 60, 62 to deliver a current signal through summing resistor 64 to the input of summing amplifier 58. The current signal is offset from zero by a predetermined amount, and it is poled to be opposite in polarity to the signal delivered to summing resistor 56.

The output of summing amplifier 58 is delivered to one input of summing amplifier 66 of modulator 22. Another, oppositely poled, input is connected to receive signals from a high frequency oscillator 68 which has a frequency many times higher than that of oscillator 32, for example, at 20 kHz.

Series inductors 70, 72 which may be air or iron cored and which may be coupled or uncoupled are connected between switches 26, 28 and the load 12. A shunt smoothing capacitor 74 is connected across the load 12.

In operation, the oscillator 32 delivers signals which may be sinusoidal or other desired shape through multiplier 34, rectifier 36, inverting amplifier 54 and summing resistor 56 to the input of pulse width modulator 22. The pulse width modulator delivers a substantially constant amplitude square wave signal at 20 kHz, with the individual signal cycles or pulses width-modulated in response to the input signal through summing resistor 56. The string of pulses, substantially at 20 kHz, are delivered to the bases of power transistors 18, 20. One conducting signal is delivered when a pulse jumps upward, and a conducting signal is delivered to the other transistor when a pulse jumps downward. Conduction of transistors 18, 20 causes conduction from DC power source 10 through one-half of the primary winding 15 through a transistor to ground. Conduction of current in the primary winding causes voltage in the secondary winding 24 to be applied to the electronic switches 26, 28.

The oscillator 32 drives the square wave driver 30 to deliver a gating voltage to switch 26 during a positive half-cycle of the output of oscillator 32 and to deliver a gating voltage to switch 28 during the negative half-cycle of the output of oscillator 32. When an electronic switch 26 is gated on, a stepped-up voltage substantially at the waveform of the output of modulator 22 is delivered through inductor 70 or 72 depending upon which gate is on. The pattern of 20 kHz pulse width modulated pulses applied to inductors 70 or 72 determines the shape of the voltage waveform produced across the load 12 after filtering out of the 20 kHz component.

The voltage from the voltage transformer 46 is rectified and delivered to the sample and hold circuit 52 which samples on the peak of its applied voltage. The output of the sample and hold circuit 52 is applied to error amplifier 44 which delivers a signal which modifies the multiplier constant of multiplier 34 in accordance with the difference between a reference voltage and the voltage output of the sample and hold circuit 52. The voltage delivered by amplifier 44 is never below a predetermined amount so that there is always a signal from oscillator 32 delivered to modulator 22 to control the wave form of the signal across the load.

A signal which is a measure of the current delivered to load 12 is delivered, in rectified form, by current transformer 59 through diodes 60, 62 to the summing resistor 64 and thence to the input of modulator 22. Note that the polarity of the signal delivered by amplifier 54 and the signal delivered from current transformer 59 are oppositely poled. When the two signals are in phase but oppositely poled, the signal from the oscillator 32 will be slightly larger so that there is still a control signal controlling the modulation and, hence, the wave form at the load 12. When the phases of the two signals differ, the input to the modulator 22 is distorted, and the resulting voltage phase at the load 12 is adjusted in phase to servo the phase of the current into phase with the voltage applied to resistor 56.

Thus, the apparatus of this invention produces 400 Hz power having a controlled current phase and voltage amplitude.

It should be noted that when the output voltage of oscillator 32 is sinusoidal, the shape of the current wave through and the voltage across load 12 are both sinusoidal, but the voltage is adjusted in phase to cause the current to be in phase with the voltage at the output of the oscillator 32.

When the shape of the voltage of oscillator 32 is something other than sinusoidal, say triangular or rectangular, the output current through load 12 is servoed to track the voltage of oscillator 32 but the output voltage will either be proportional to the time derivative or time integral, depending upon whether the load 12 is inductive or capacitive, of the load current.

Although the invention has been described in detail above, it is not intended that the invention shall be limited by that description, but only in accordance with that description in combination with the accompanying claims.

What is claimed is:

1. Apparatus for inverting DC power into power at an alternating power frequency comprising:
    an oscillator at said power frequency;
    a high frequency oscillator for generating signals at a frequency substantially higher than said power frequency;
    a pulse width modulator connected to receive signals from said high frequency oscillator and having at least two signal inputs for receiving modulating signals;
    means for rectifying the output of said power frequency oscillator;
    means for applying said rectified power frequency oscillator signal to one of said signal inputs to said modulator;
    a DC source of power;
    means connected to be responsive to the output of said pulse width modulator for switching said DC at said high frequency to produce a train of pulse width modulated power pulses;
    means connected to said source of power frequency to switch said train of power pulses back and forth between opposite polarities in synchronism with the polarity of said power frequency oscillator; and means for removing frequencies at said high frequency from said train of power pulses to produce a load voltage.

2. Apparatus as recited in claim 1 and further comprising an electrical load; means for sensing and producing a signal representative of the current delivered to said load; and means for connecting said current signal to one of said modulating inputs of said pulse width modulator.

3. Apparatus as recited in claim 2 and further comprising: means for sensing and producing a signal representative of the peaks of voltage delivered to said load; a multiplier connected between said power frequency oscillator and the input of said modulator, said modulator being connected to said last named means for sensing and producing a signal to control the amplitude of signal delivered by said power frequency oscillator to said modulator.

4. Apparatus as recited in claim 3 and further comprising apparatus connected to increase the voltage of said high frequency pulsed power train.

5. Apparatus as recited in claims 3 or 4 and further comprising means for biasing and poling the respective voltages applied to the input of said modulator to cause the current applied to said load to track the wave form of said power frequency oscillator and to cause the voltage wave form applied to said load to have a controlled peak value and to be of a wave form to cause said current to track the voltage of said power frequency oscillator.

* * * * *